(12) United States Patent
Tsukamoto et al.

(10) Patent No.: US 6,320,830 B1
(45) Date of Patent: Nov. 20, 2001

(54) OPTICAL INFORMATION REPRODUCTION DEVICE AND SIGNAL PROCESSING CIRCUIT USED THEREIN

(75) Inventors: Manabu Tsukamoto; Masayoshi Shimamoto; Kenji Goto; Takehiko Umeyama; Yoshiji Inoue, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,857

(22) Filed: Jan. 29, 1999

(30) Foreign Application Priority Data

Feb. 2, 1998 (JP) .................................. 10-021199

(51) Int. Cl.$^7$ ...................................... G11B 7/00
(52) U.S. Cl. ..................... 369/47.19; 369/44.28
(58) Field of Search ................... 369/32, 275.2, 369/44.26, 275.4, 47.19, 44.28, 44.25, 44.29, 44.35

(56) References Cited

U.S. PATENT DOCUMENTS

| 5,335,214 | 8/1994 | Matoba et al. |
| 5,422,874 | * 6/1995 | Birukawa et al. ............. 369/275.2 |
| 5,444,682 | * 8/1995 | Yamada et al. ..................... 369/32 |
| 6,044,051 | * 3/2000 | Miyagawa et al. ................ 369/47 |

FOREIGN PATENT DOCUMENTS

| 0588305 A2 | 3/1994 | (EP) . |
| 0 757343 A1 | 2/1997 | (EP) . |
| 0757343 A1 | 2/1997 | (EP) . |
| 0801382 A2 | 10/1997 | (EP) . |
| 231164 4 | 10/1997 | (GB) . |
| 63 57859 | 11/1988 | (JP) . |
| 0504094 4A | 2/1993 | (JP) . |
| 6 176404 | 6/1994 | (JP) . |
| 10 31822 | 2/1998 | (JP) . |
| WO 96 25736 | 8/1996 | (WO) . |

* cited by examiner

*Primary Examiner*—David Hudspeth
*Assistant Examiner*—Kim-Kwok Chu

(57) ABSTRACT

In an optical information reproduction device for reproducing information from an optical disk medium on which an identification information area including first identification information shifted radially outward with respect to the center of a recording track by a specified distance and second identification information shifted radially inward with respect to the center of a recording track by a specified distance, and a user information area disposed along the center of a recording track are disposed, information is reproduced using a sum signal and a difference signal of the outputs from a split photodetector having at least two light-receiving parts disposed on opposite sides of a track tangential line. The first or second identification information signal is inverted and the direct-current component in the identification information signal and the user information signal are removed.

25 Claims, 13 Drawing Sheets

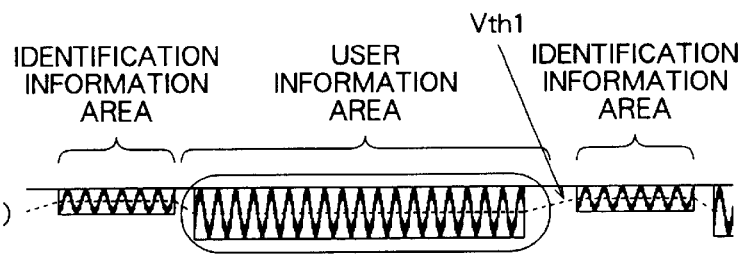
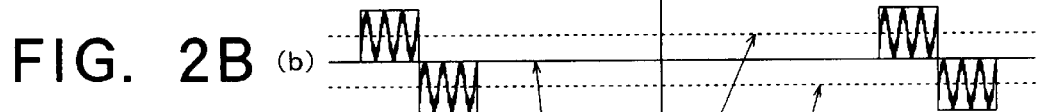
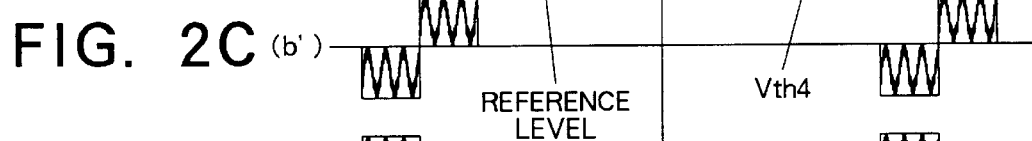
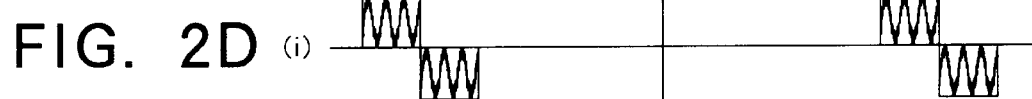
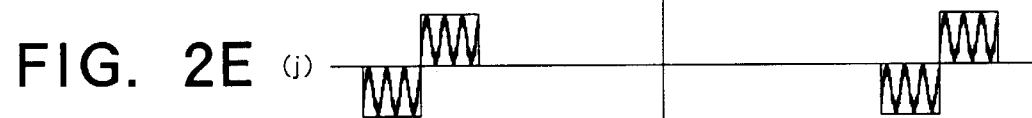
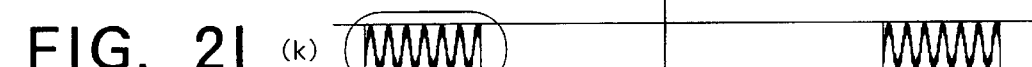
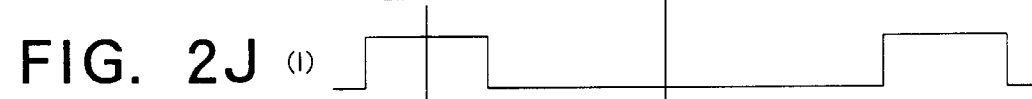
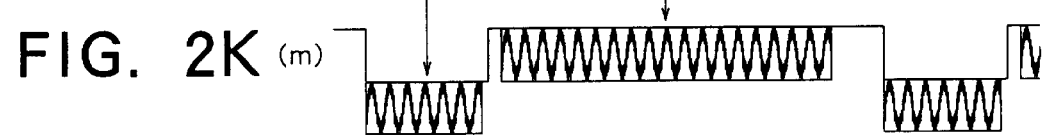

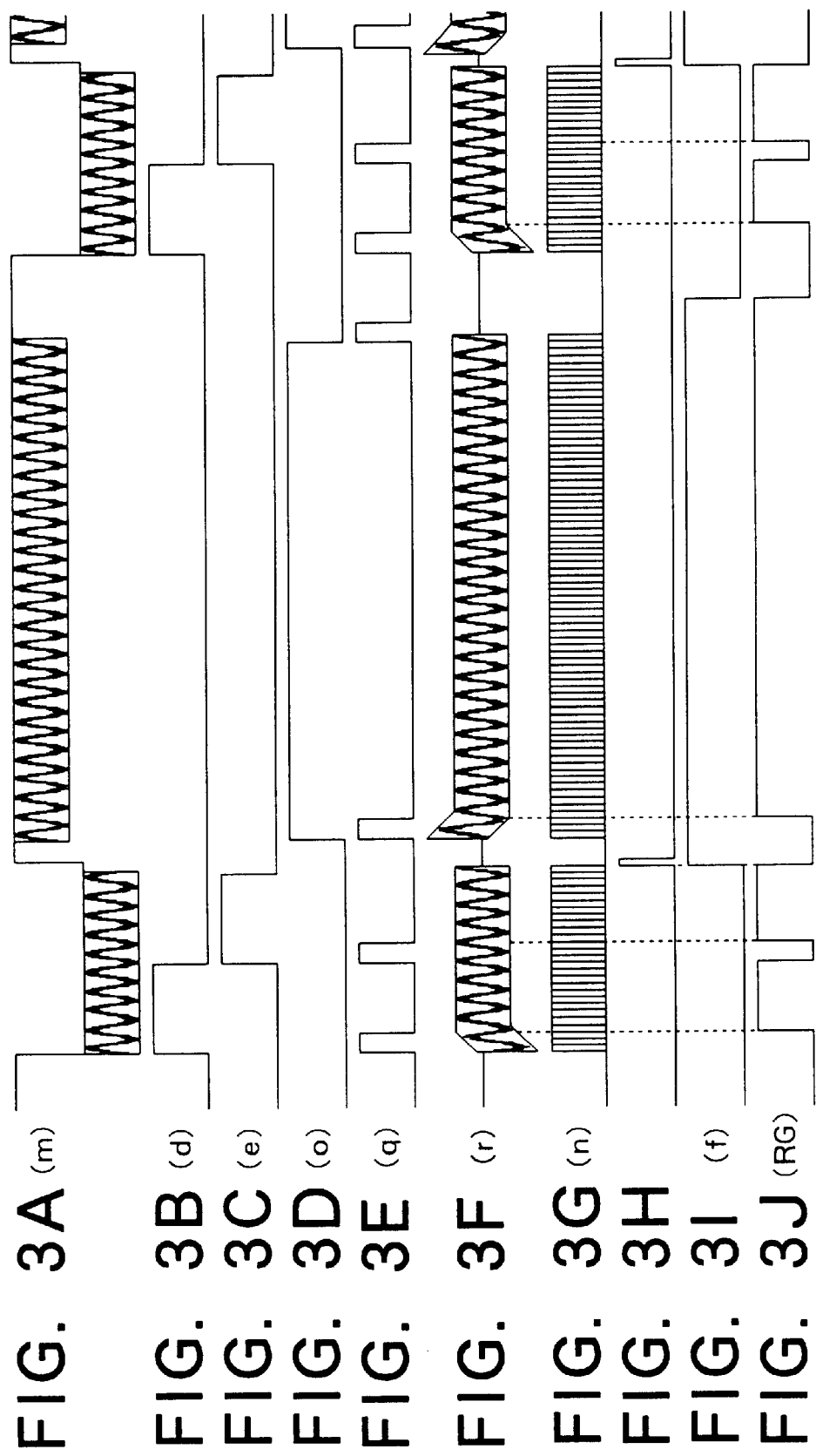

OPTICAL INFORMATION REPRODUCTION DEVICE AND SIGNAL PROCESSING CIRCUIT USED THEREIN

BACKGROUND OF THE INVENTION

The present invention relates to an optical information reproduction device. More specifically, this invention relates to a device for optically reproducing information from a disk medium on which concentric or spiral tracks are disposed, the medium comprising identification information areas in which identification information representing address information and the like are shifted radially inward and radially outward each approximately by a predetermined distance with respect to a track center and user information areas in which user information and the like are recorded on the center of a track.

In recent years, it has been demanded that a memory means for storing information store image information, video information, and other voluminous information in comparison with the conventional textual information and sound information, and optical disks have been attracting attention as a response to the demand. Conventional recordable optical disks are provided with guide grooves formed at the time of the production of the disk. The guide grooves are used to keep the light beam for recording and reproduction in the center of a track. These guide grooves result in convex areas (lands) and concave areas (grooves) formed in spiral or concentric form on the disk. The disk using both the convex areas and concave areas as recording tracks (land tracks and groove tracks) can record twice as much information as a disk using either areas as recording tracks. This method is referred to as a land/groove recording method and is described in Japanese Patent Application Kokoku Publication No. 57859/1988.

A recording track is generally divided into sectors in the direction of the track, and in each of the sectors, identification information, such as a track number, and a sector number, is preformatted as physically formed convex and concave pits. The identification information is disposed in either of these methods: In one method, dedicated identification information for a land track or groove track is disposed; in another method, the information is disposed in a position shifted in a radial direction so that the information can be shared by a land track and a groove track adjacent to the land track, more specifically, along the boundary between a land track and a groove track.

The former method in which exclusive identification information is disposed in each track enables track-specific information to be included, making it easy to control the device. In the mastering of this type of disk, the pit width needs to be sufficiently narrower than the track pitch. It is therefore difficult to form desired pits with the same laser beam as that used for forming guide grooves. Thus, disk production process is complicated.

In the latter method of sharing identification information by a land track and a groove track adjacent to the land track, the device needs to judge which track is being reproduced because two tracks share the identification information, and the control is a little more complicated than that for the former exclusive disposition method. However, the same laser beam as that used for forming guide grooves can be used for pre-formatting the identification information in mastering, which can be done by deflecting the laser beam in a radial direction just by ¼ of the distance between the centers of the adjacent lands, by the use of a light deflection means. This type of optical disk and an optical information reproduction device using such optical disks are disclosed in Japanese Patent Application Kokai Publication No. 176404/1994.

An optical information reproduction device using an optical disk on which identification information is disposed in the latter method will next be described. FIG. 7 shows the track format of the conventional optical disk. FIG. 8 shows how the conventional identification information portion is disposed. FIG. 9 is a block diagram showing the configuration of the optical information reproduction device for reproducing information from that type of optical disk.

In FIG. 7 and FIG. 8, reference numeral 1 denotes an identification information area in which identification information is preformatted; reference numeral 2 denotes a user information area In which user information is recorded by means of a variation in the local optical constant or physical shape; reference numeral 3 denotes a groove track; and reference numeral 4 denotes a land track. As shown in the figures, the groove track 3 or land track 4 is disposed in spiral form in the full circumferential extent, and the tracks are divided into sectors in the direction of the tracks. A sector includes, at the beginning, the identification information area 1 in which information for identifying the sector, such as the track number and sector number is recorded, and the identification information area 1 is followed by the user information area 2 for recording user data and the like. The identification information is shared by the land track 4 and the groove track 3 adjacent to the land track, and the displacement of the identification information from the track center of the land track 4 or groove track 3 is ¼ of the distance between adjacent land tracks 4 or of adjacent groove tracks 3.

The configuration of the conventional optical information reproduction device will next be described with reference to FIG. 9. In the figure, reference numeral 11 denotes an optical disk; reference numeral 12 denotes a spindle motor; reference numeral 13 denotes an optical head; reference numeral 14 denotes a first current-to-voltage (I/V) converting means; and reference numeral 15 denotes a second I/V converting means.

An adding means 16 adds the output of the first I/V converting means 14 and the output of the second I/V converting means 15.

A sum signal detecting means 17 detects the information recorded on the disk by processing and then converts the output (a) of the adding means 16 into binary values.

A subtracting means 18 obtains a difference between the output of the first I/V converting means 14 and the output of the second I/V converting means 15.

A polarity reversing means 19 reverses the polarity of the output waveform (b) of the subtracting means 18 according to the control signal from a controller 26, which will be described later.

A difference signal detecting means 20 detects the information recorded on the disk by processing and then converts the output (d) of the polarity reversing means 19 into binary values.

A signal selecting means 21 selects the output (c) of the sum signal detecting means 17 or the output (e) of the difference signal detecting means 20 according to the control signal (f) from a control gate generation means 25, which will be described later.

A clock generation means 22 generates the reproduction clock (CK) in synchronization with the output (g) of the signal selecting means 21 according to a control gate signal (RG) from the control gate generation means 25.

A data demodulating means 23 judges whether the output (g) of the signal selecting means 21 is at level "1" or "0" at the timing of the reproduction clock from the reproduction clock generation means 22 and demodulates the data.

An address information reproduction means 24 reproduces an address after reproducing identification information by judging at the timing of the reproduction clock from the reproduction clock generation means 22 whether the output (g) of the signal selecting means 21 is at level "1" or "0".

The control gate generation means 25 generates the control gate signal mentioned earlier, with reference to the timing of the address reproduction completion signal from the address information reproduction means 24.

The controller 26 outputs a control signal to the polarity reversing means 19 according to the address information from the address information reproduction means 24.

The optical head 13 comprises a laser diode (LD) 131, a collimate lens 132, a beam splitter (BS) 133, a converging lens 134, and a photodetector (PD) 135.

The operation of a prior-art optical information reproduction device configured as described above will be described with reference to FIG. 9 and FIG. 10A to FIG. 10H. FIG. 10A to FIG. 10H show waveforms at various points in FIG. 9.

When the optical disk 11 is placed, by a mechanism, not shown, on the spindle motor 12, the controller 26 sends a spindle activation signal and speed information, which are not shown, to a rotation controlling means, which is not shown, to adjust the spindle motor 12 to a predetermined speed. Then, the laser diode 131 of the optical head 13 is turned on by a lighting command, which is not shown, from the controller 26. The output of the laser diode 131 is kept to a constant value by a feedback controlling means, which is not shown.

The collimate lens 132 converts the laser beam emitted from the laser diode 131 into parallel rays of light, which pass the beam splitter 133 and are converged onto the optical disk 11 by the converging lens 134. After passing the converging lens 134, the far field pattern of the light reflected from the optical disk 11 (return light), which includes the information component on the optical disk 11, is reflected by the beam splitter 133 and projected onto the photodetector 135. The photodetector 135 has at least two light-receiving parts which are disposed on opposite sides (radially outward and radially inward sides) of a track tangential line in the projected far-field pattern, i.e., of a track tangential line in the far field of the information pits on the optical disk 11. In this connection, the optical system for passing the light beam from the laser diode 131 in the optical head 13 to the surface of the optical disk 11, and passing the light reflected at the surface of the optical disk 11 to the photodetector 135 is so designed that the center of the far field pattern of the information pits on the optical disk 11 is formed at the boundary between the two parts of the photodetector 135.

The optical system of the optical head 13 is adjusted so that the position of the beam spot in the radial direction can be controlled through the use of the light distribution information on the two-part split photodetector 135.

When the beam spot is in the center of a track, identical amounts of light strike the two parts of the split photodetector 135, and the difference between the two outputs, that is a push-pull signal, is zero. As the beam spot goes away from the center of the track, the distribution of light on the two-part split photodetector becomes unbalanced, increasing the value of the push-pull signal. The value of the push-pull signal is zero when the beam spot is in the center of the land track 4 or groove track 3, and the value is maximized or minimized when the beam spot is on the boundary between the land track 4 and groove track 3.

Tracking to keep the beam spot in the center of a track can be performed through feedback control to set the difference between the output signals from the two-part split photodetector 135 to zero. This technique is commonly utilized as a tracking method for optical disks having guide grooves.

The light reflected from the optical disk 11 (return light) including the information component on the optical disk 11, which is mentioned above, is converted into current signals by the photodetector 135, which are then converted into voltage signals by the first I/V converting means 14 and the second I/V converting means 15 in the subsequent stage. By obtaining the difference between the voltage signals at the subtracting means 18, a tracking error signal can be obtained in the push-pull method mentioned above. Using this signal, a tracking control means, which is not shown, performs control so that the beam spot always scans the center of a track.

As for displacements in the direction of the optical axis of the light beam such as undulation of the surface of the disk, a focus controlling means, which is not shown, performs control to keep the beam spot converged onto the optical disk 11.

With the beam spot controlled by the controlling means mentioned above, the information on the optical disk 11 is read. Information is recorded onto the optical disk 11. The following description is limited to the reproduction of the information.

The voltage signals from the first I/V converting means 14 and the second I/V converting means 15 are added by the adding means 16 to form a waveform as shown as (a) in FIG. 10A. The output from the subtracting means 18 mentioned above has a waveform as shown as (b) in FIG. 10C or (b') in FIG. 10D when the beam spot is at the center of a track. Whether the waveform is like (b) or (b') depends on whether the position of pits in the identification information area 1 is shifted radially inward or radially outward with respect to the center of the land track 4. Since the beam spot is at the center of the track in the user information area, the outputs from the two parts of the split photodetector 135 are the same, and the output of the subtracting means 18 is 0 (or a reference level).

Suppose the light beam is scanning pits in the identification information area which are shifted radially inward with respect to the center of the land track. If the outputs from the two I/O converting means are connected to the subtracting means 18 in such a manner that the signal reproduced from the identification information area has the waveform as shown as (b) in FIG. 10C when the land track of the optical disk 11 is reproduced, the signal reproduced from the identification information area in the groove track reproduction has a waveform as shown as (b') in FIG. 10D. The reverse also holds.

When the information on the optical disk 11 is reproduced according to the output of the adding means 16, the analog signal output from the adding means 16 is judged to be larger or smaller than a predetermined slice level (Vth1) and is converted into binary values by the sum signal detecting means 17 and has a waveform as shown as (c) in FIG. 10B.

The reproduction of the identification information in the identification information area 1 on the optical disk 11 according to the output from the subtracting means 18 will next be described. This method is disclosed in Japanese Patent Application Kokai Publication No. 176404/1994.

The polarity of the reproduction waveform of the analog signal output from the subtracting means 18 differs depending on whether the reproduced track is a land track or a groove track, as described above. Generally, the level slicing means that produces binary values by slicing the analog waveform is designed with the polarity of input signal fixed. A system In which the polarity of the reproduced waveform changes therefore requires the polarity reversing means 19 to provide a signal of a fixed polarity.

The polarity reversing means 19 can be easily controlled if the relationship between the track and the polarity of the reproduced waveform is known beforehand. That is, the controller 26, which will be described below, may operate the polarity reversing means 19 by judging whether the sector being scanned is on the land track or groove track. As a result, as shown as (d) in FIG. 10E, the polarity of the reproduced waveform of the identification information is maintained, irrespective of whether the sector being scanned is in the land track or groove track. In the shown example, the waveform is kept below the reference level. The output of the polarity reversing means 19 is converted into binary values by the difference signal detecting means 20, resulting in the waveform as shown as (e) shown in FIG. 10F.

The method of reproducing the identification information such as a track address and sector address and the user information such as user data from binary signals will next be described. It is incidentally noted that "user information" includes data used for phase-locked loop pulling-in, synchronization pattern, error-detection and correction codes, as well as "user data".

First, if the identification information and user information are reproduced through the use of the output (c) of the sum signal detecting means 17, the signal selecting means 21 is set to always select the output (c) of the sum signal detecting means 17.

If the output (e) of the difference signal detecting means 20 is used to reproduce the identification information and the output (c) of the sum signal detecting means 17 is used to reproduce the user information, the signal selecting means 21 accordingly switches to select the desired signal. The switching of the signal selecting means 21 is made according to the switching signal (f) (shown in FIG. 10G) from the control gate generation means 25, which will be described later. The switching signal is generated by an internal timer or the like, which is started by a timing signal which can identify a known position within a sector, such as the address detection completion timing signal from the address information reproduction means 24.

The output (g) of the signal selecting means 21 is supplied to the reproduction clock generation means 22, the data demodulating means 23, and the address information reproduction means 24.

The reproduction clock generation means 22 generates the reproduction clock in synchronization with the output signal (g) from the signal selecting means 21, using a phase locked loop (PLL) means. The reproduction clock generation means 22 is designed to operate within the area in which the information to be reproduced is present, according to a read gate signal (RG) from the control gate generation means 25.

The address information reproduction means 24 reproduces the identification information by checking at the timing of the reproduction cloak from the reproduction clock generation means 22 whether the output signal (g) from the signal selecting means 21 is at "1" or "0", and thereby detects an address.

The data demodulating means 23 demodulates data by checking at the timing of the reproduction clock from the reproduction clock generation means 22 whether the output signal (g) from the signal selecting means 21 is at "1" or "0" and then performs decoding, error correction, and de-interleaving.

The control gate generation means 25 generates the switching signal (f) (shown in FIG. 3I) of the signal selecting means 21 and the read gate signal (RG) (shown in FIG. 3J, to be supplied to the reproduction clock generation means 22) according to the internal timer, started at the address detection completion timing (shown in FIG. 3H) provided by the address information reproduction means 24. The address detection completion timing is a timing when the decoding of the address having been read from the identification information area is completed. In the drawing, it is shown to be immediately after the end of the identification information area.

The controller 26 identifies the sector from which information is being reproduced according to the address reproduced by the address information reproduction means 24 and the information indicating whether information is being reproduced from a land track or a groove track, which is obtained from the tracking control means. If the track from which information is to be reproduced is changed at an access or on other occasions, the controller judges whether the track containing the target sector is the land track or groove track and outputs a control signal for setting the polarity of the output signal to the polarity reversing means 19. In addition, the controller 26 controls the whole device, which is not shown.

As described above, because the identification information is disposed between a land track and a groove track, being shifted from a track center, the identification information can be reproduced and detected regardless of whether the beam spot is scanning a land track and a groove track. Because the identification information need not be separately formed for the land track and for the groove track, the number of processes in optical disk mastering can be reduced.

However, because identification information is shared by a land track and a groove track, as described above, it is hard to identify a sector Just by reproducing the address, and the information indicating whether information is being reproduced from a land track or a groove track is additionally required.

Because the identification information is shifted from a track center, any track offset of the beam spot in a radial direction away from the identification information causes the amplitude of the signal reproduced from the identification information to be degraded, reducing the address detection accuracy. A low address detection accuracy will result in a low recording reliability or a low reproduction reliability.

In addition, it is hard to identify whether the track from which information is being reproduced is a land track or a groove track Just by detecting the identification information.

Further, because the identification information and user information are separately detected, the scale of the circuit is large.

To solve these problems, an optical disk with the identification information disposed in a staggering manner as shown in FIG. 11 is provided. A feature of this disposition is that identification information is split into two areas and that the information of one area (hereafter referred to as the first identification information) is shifted by a predetermined distance radially outward with respect to the track center, and the information of the other area (hereafter referred to as the second identification information) is shifted by a predetermined distance radially inward with respect to the track center and radially inward with respect to the center of the track. The amount of shift is preferably about ½ of the track pitch.

If this identification information is used for tracking control, the tracking offset can be canceled. That is, when the first identification information and second identification information reproduced by the subtracting means mentioned above have the same reproduction amplitude, the beam spot is judged to be at the center of the track.

Based on the order of detection in which the first identification information area and the time at which the second identification information area are detected, the track on which the beam spot is scanning can be known. That is, when the beam spot is scanning a land track, the first identification information (shifted radially outward) is detected, and then the second identification information (shifted radially inward) is detected. When the beam spot is scanning a groove track, the second identification information (shifted radially inward) is detected, and then the first identification information (shifted radially outward) is detected. Through the use of this relationship, whether the track from which the information is being reproduced is in a land track or in a groove track can be judged, and the sector can be identified just by reproducing the identification information.

The conventional optical information reproduction device as described above with reference to FIG. 8, however, is designed on the assumption that the identification information is shifted in only one direction with respect to the track center, and the polarity reversing means can be controlled just in units of tracks, that is, the polarity is switched not switched until the end of each land track or each grove track. With this configuration, it is impossible to control the signal polarity for each piece of identification information. Accordingly, if the conventional optical information reproduction device is used to reproduce information from an optical disk as shown in FIG. 11, Just the output of the adding means can be used to detect the identification information, and the push-pull signal output from the subtracting means cannot be used. In this case, the first identification information and second identification information cannot be separately detected, and whether the track from which information is reproduced is a land track or a groove track cannot be judged solely from the detected identification information.

Moreover, a judging means, such as one which makes judgment by evaluating the accuracy or reliability of address detection, for deciding which of the outputs from the adding means and subtracting means is to be used for reproduction of the identification information is not available, and the address detection accuracy may therefore be degraded.

SUMMARY OF THE INVENTION

The present invention relates to an optical information reproduction device for reproducing information from an optical disk with identification information disposed in a staggering manner, and seeks to solve the problems of the conventional device as described above.

A first object of the invention is to provide an optical information reproduction device for reproducing information from an optical disk having a first identification information area and a second identification information area in which identification information representing address information and the like are disposed, being shifted respectively radially outward and radially inward by a predetermined distance with respect to the track center and a user information area in which user information and the like are recorded on the center of a track.

A second object of the invention is to enable reproduction of both the first identification Information and the second identification information to be effected by a common means, by utilizing the information indicating the position of appearance of the first identification information and the second identification information, and by making the first identification information and second identification information similar in reproduced waveform pattern in the stage of analog waveform.

A third object of the invention is to enable reproduction of information after binarizing the analog waveform, with regard to the identification information and the user information to be effected by a common means, by utilizing the information indicating the position of appearance of the first identification information and second identification information and the information indicating the position of appearance of the user information, and by making the first and second identification information and user information similar in reproduced waveform pattern in the stage of analog waveform.

A fourth object of the invention is to provide a means for enabling a high-speed return even if the reproduced waveform is disturbed by a defect or flaw on the medium.

A fifth object of the invention is to improve the probability of signal detection by keeping an optimum slice level for binarization of an analog waveform and by applying an offset.

A sixth object of the invention is to improve the probability of signal detection by separately setting offset values to be applied to the slice level for the first and second identification information areas and the user area.

A seventh object of the invention is to optimize the slice level at a high speed by reducing the time constant for slice level control immediately after the beginning of the first and second identification information and user information and Immediately after a defect on the medium.

An eighth object of the invention is to improve the probability of signal detection by separately setting the period for which the control time constant of the direct-current component rejection means is reduced and the period for which the time constant of slice level control is reduced.

A ninth object of the invention is to improve the probability of signal detection at a variety of reproduction speeds by adjusting the period for which the control time constant of the direct-current component rejection means is reduced and the period for which the time constant of slice level control is reduced, according to the reproduction speed.

A tenth object of the invention is to improve the probability of signal detection at a verity of reproduction speeds by adjusting the control time constant of the direct-current component rejection means and the time constant of slice level control, according to the reproduction speed.

An eleventh object of the invention is to improve the probability of signal detection by separately setting offset value for the first and second identification information and user information of the land track and of the groove track on a disk medium.

An optical information reproduction device according to the present invention is for reproducing information from an optical disk medium on which an identification information area including first identification information shifted radially outward with respect to the center of a recording track by a specified distance and second identification information shifted radially inward with respect to the center of a recording track by a specified distance, and a user information area disposed along the center of a recording track are disposed in concentric or spiral form, said optical information reproduction device comprising:

an optical head illuminating the optical disk medium with a light beam, and including a split photodetector having at least two light-receiving parts disposed on opposite side of a track tangential line in the far field of the optical disk medium and receiving light reflected from the optical disk medium, an adding means for adding the outputs of said optical head;

a subtracting means which obtains a difference between the outputs of said optical head;

a difference signal processing means which makes the output of said subtracting means similar to the output signal of said adding means in waveform pattern;

a signal selecting means which selectively outputs the output of said adding means and the output of said difference signal processing means; and a waveform shaping means which detects the information recorded on said disk medium from the output signal of said signal selecting means;

said signal selecting means being set to select the output of said difference signal processing means or the output of said adding means when said identification information area is being scanned and to select the output of said adding means when said user information area is being scanned.

A signal processing circuit according to another aspect of the invention is for used in an optical information reproduction device for reproducing information from an optical disk medium on which an identification information area including first identification information shifted radially outward with respect to the center of a recording track by a specified distance and second identification information shifted radially inward with respect to the center of a recording track by a specified distance, and a user information area disposed along the center of a recording track are disposed in concentric or spiral form, and including an optical head illuminating the optical disk medium with a light beam, and including a split photodetector having at least two light-receiving parts disposed on opposite side of a track tangential line in the far field of the optical disk medium and receiving light reflected from the optical disk medium, and comprises an adding means for adding the outputs of said split photodetector;

a subtracting means which obtains a difference between the outputs of said split photodetector;

a difference signal processing means which makes the output of said subtracting means similar to the output signal of said adding means in waveform pattern;

a signal selecting means which selectively outputs the output of said adding means and the output of said difference signal processing means; and a waveform shaping means which detects the information recorded on said disk medium from the output signal of said signal selecting means;

said signal selecting means being set to select the output of said difference signal processing means or the output of said adding means when said identification information area is being scanned and to select the output of said adding means when said user information area is being scanned.

The difference signal processing means may comprise:

a polarity inverting means for inverting the polarity of the output of the subtracting means;

a selecting means for selectively outputting the output of the subtracting means and the output of the polarity inverting means; and a polarity switching signal generation means for generating a switching timing for the selecting means.

The polarity switching signal generation means may comprise:

a first gate generating means for generating a first gate signal indicating the position at which the first identification information appears;

a second gate generating means for generating a second gate signal indicating the position at which the second identification information appears; and a polarity judging means for judging the polarity of the waveform of the output of the subtracting means.

The waveform shaping means may comprise:

a direct-current component rejection means for removing the direct-current component of the output of the signal selecting means with a predetermined time constant;

a third gate generation means for generating a gate signal indicating the position at which the user information appear;

a fourth gate generation means for generating a gate signal indicating the position of a defect;

a boost gate generation means for generating a first boost gate signal for changing the time constant of the direct-current component rejecting means in accordance with the outputs of said first gate generation means, said second gate generation means, said third gate generation means, and said fourth gate generation means; and a signal slice means for binarizing the output of the direct-current component rejection means;

said direct-current component rejection means reducing said time constant for a predetermined period after the beginning of the first identification information, the beginning of the second identification information, the beginning of the user information, and the end of the defect.

The signal slice means may comprise:

a first binarization means for binarizing the output of the direct-current component rejection means at a slice level;

a slice level control means for controlling the slice level to an optimum value with a predetermined time constant based on the output of said first binarization means;

a slice level adjustment means for applying an offset to the slice level set by said slice level control means; and a second binarization means for binarizing the output of the direct-current component rejection means at the output of said slice level adjustment means.

The slice level adjusting means may be configured so that it can set the offset values separately for the first identification information, the second information, and the user information.

The slice level adjustment means may be configured to generate a second boost gate signal of a predetermined duration generated in accordance with the outputs of the first to fourth gate generation means, and reduces the time constant for control of the slice level, for the period of said second boost gate signal.

The boost gate generation means and the slice level adjustment means may be configured so that they can set the period of the boost gate signal separately from each other.

The boost gate generation means and the slice level adjustment means may be configured so that they can vary the period of the boost gate signal according to the reproduction speed.

The direct-current component rejection means, and said slice level control means may be configured so that they can vary the time constant for control according to the reproduction speed.

The recording tracks on the optical disk may comprise groove tracks in concentric or spiral form on the optical disk medium, and land tracks formed between groove tracks, and said slice level adjustment means may be configured so that it can set the offset separately for the first identification information, the identification offset information, and the user information of the groove tracks and land tracks.

BRIEF DESCRIPTION OF THE DRAWINGS

In the accompanying drawings:

FIG. 2A to FIG. 2K show the waveforms of outputs from different blocks forming the optical information reproduction device of the first embodiment of the present invention;

FIG. 3A to FIG. 3J show the waveform of output from the waveform shaping means forming the optical information reproduction device of the first embodiment of the present invention;

DETAILED DESCRIPTION OF THE PREFERRED EMBODIMENTS

Figure 9:
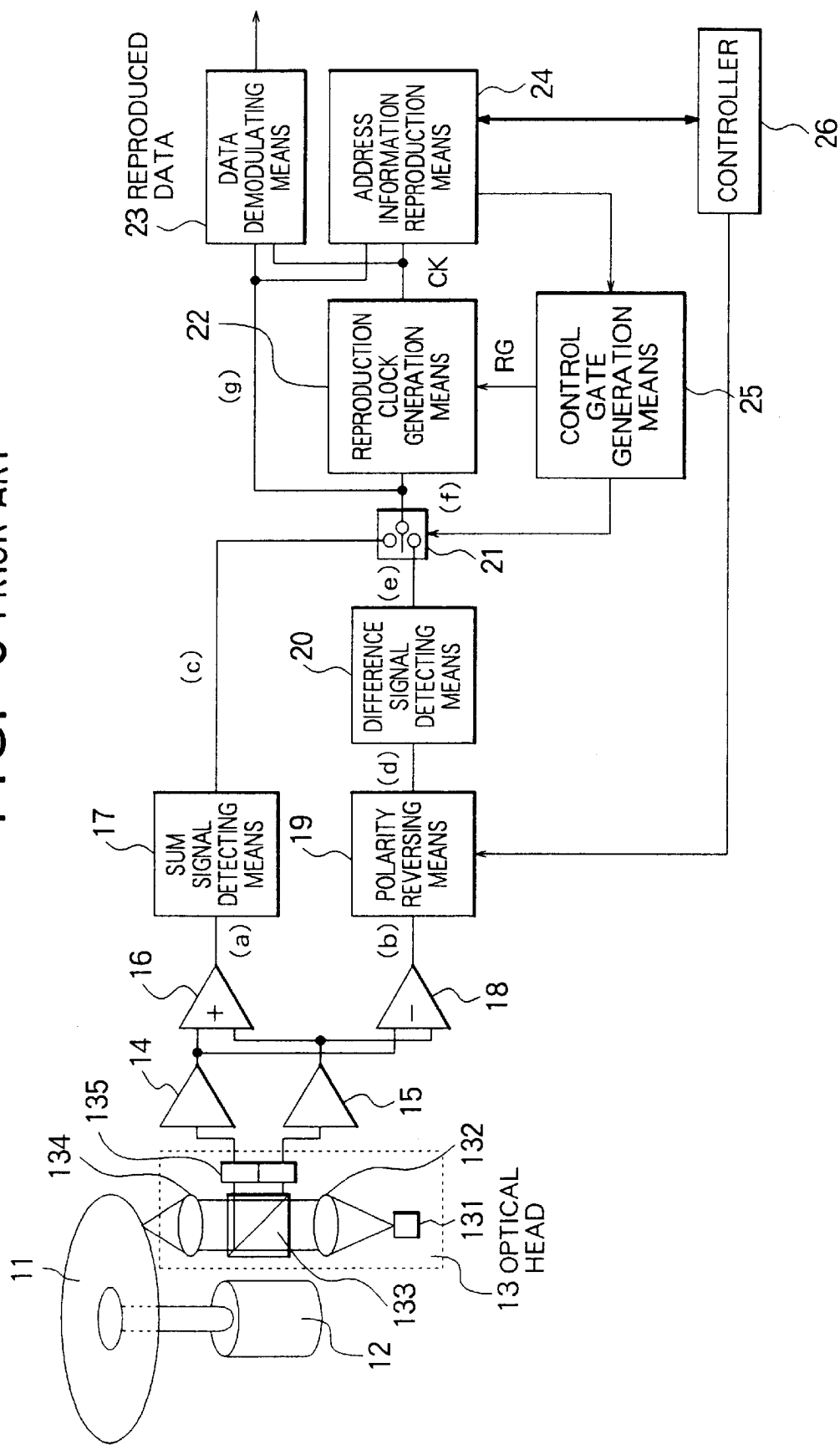
FIG. 9 shows a block diagram of the conventional optical information reproduction device.
Figure 10:
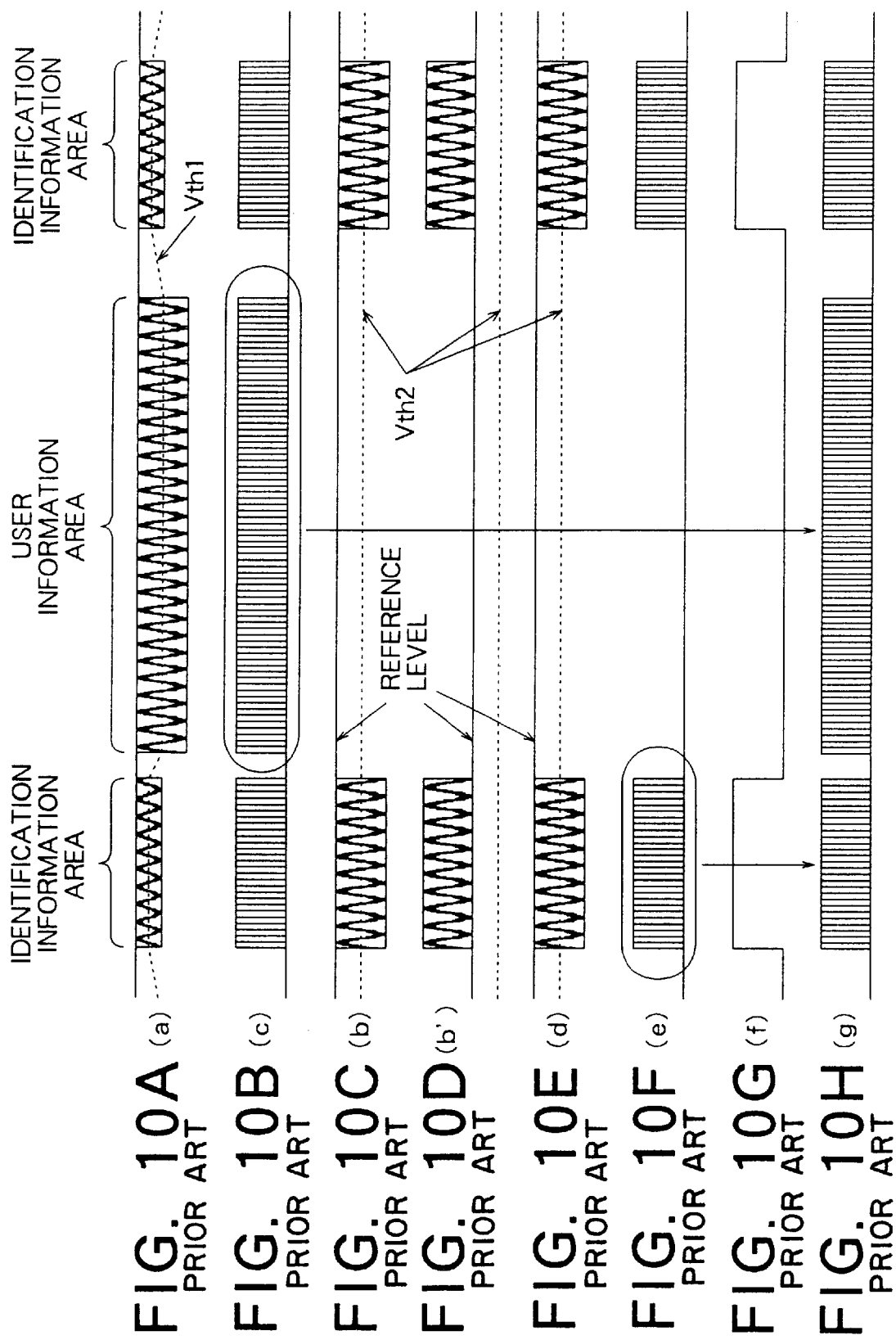
FIG. 10A to FIG. 10H shows the waveforms of outputs from different blocks forming the conventional optical information reproduction device.

The present invention will next be described in more detail with reference to figures showing embodiments. In the description of the embodiments, blocks having the same reference numerals as those used in the description of the prior art is basically the same as the corresponding blocks of the prior-art optical information reproduction device shown in FIG. 9, and the detailed description of such blocks will be omitted.

Embodiment 1

Figure 1:
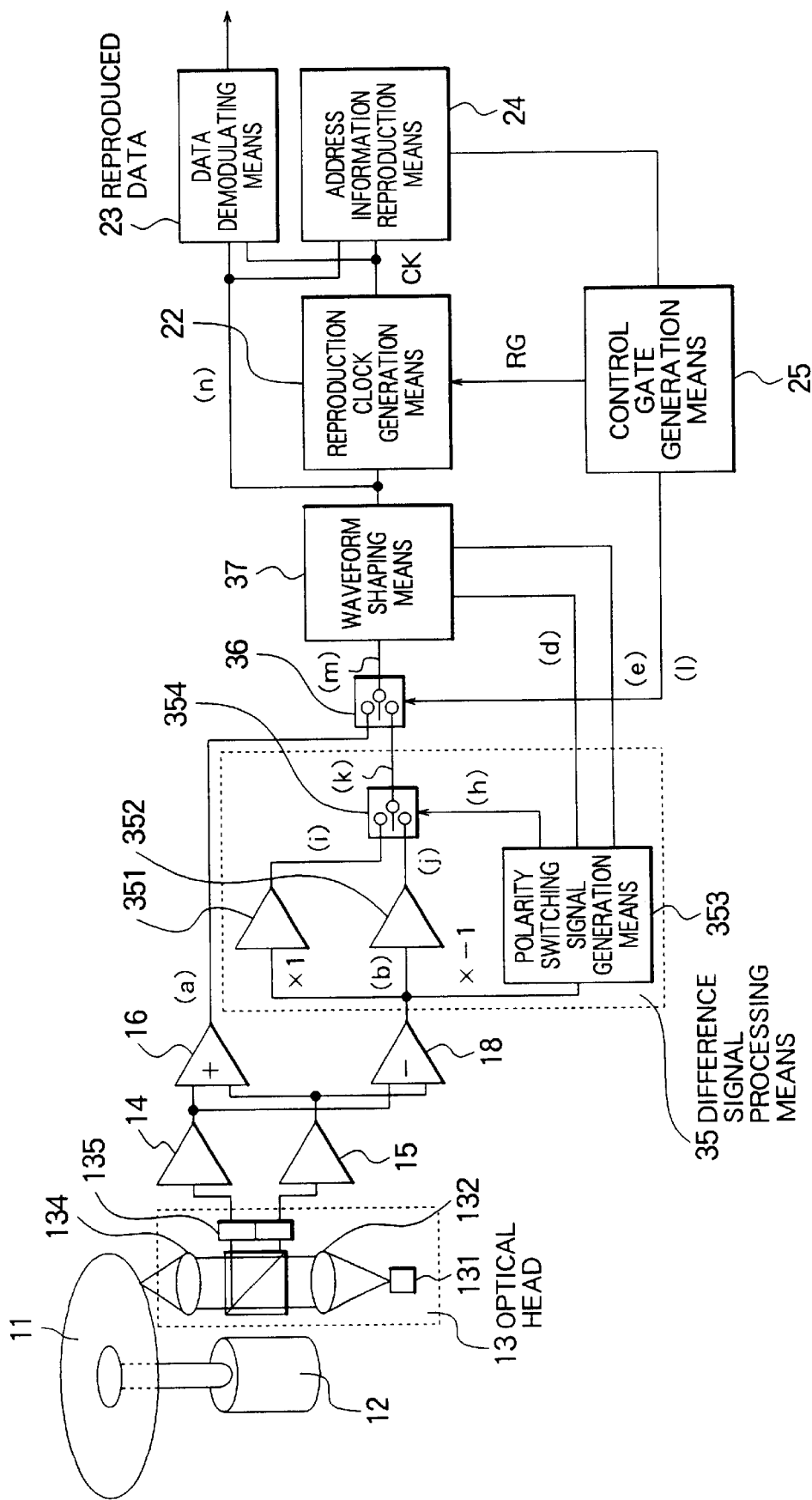
FIG. 1 is a block diagram of the optical information reproduction device of the first embodiment of the present invention.

FIG. 1 shows the optical information reproduction device of the first embodiment of the present invention. In the figure, reference numeral 11 denotes an optical disk; reference numeral 12 denotes a spindle motor; reference numeral 13 denotes an optical head; reference numeral 14 denotes a first I/V converting means; reference numeral 15 denotes a second I/V converting means; reference numeral 16 denotes an adding means; reference numeral 18 denotes a subtracting means; reference numeral 35 denotes a difference signal processing means; reference numeral 36 denotes a signal switching means; reference numeral 37 denotes a waveform shaping means; reference numeral 22 denotes a reproduction clock generation means; reference numeral 23 denotes a data demodulating means; reference numeral 24 denotes an address information reproduction means; and reference numeral 25 denotes a control gate generation means that generates a control gate signal with reference to the timing of the address reproduction completion signal from the address information reproduction means 24.

The difference signal processing means 35 comprises a buffer amplifier 351, reversing buffer amplifier 352, polarity switching signal generation means 353, and switching means 354.

The operation of the optical information reproduction device of the embodiment as described above for reproducing information from the optical disk shown in FIG. 11 will be described with reference to FIG. 1, FIG. 2A to FIG. 2K, and FIG. 3A to FIG. 3G. FIG. 2A to FIG. 2K and FIG. 3A to FIG. 3G show the waveforms at various points in FIG. 1.

Figure 11:
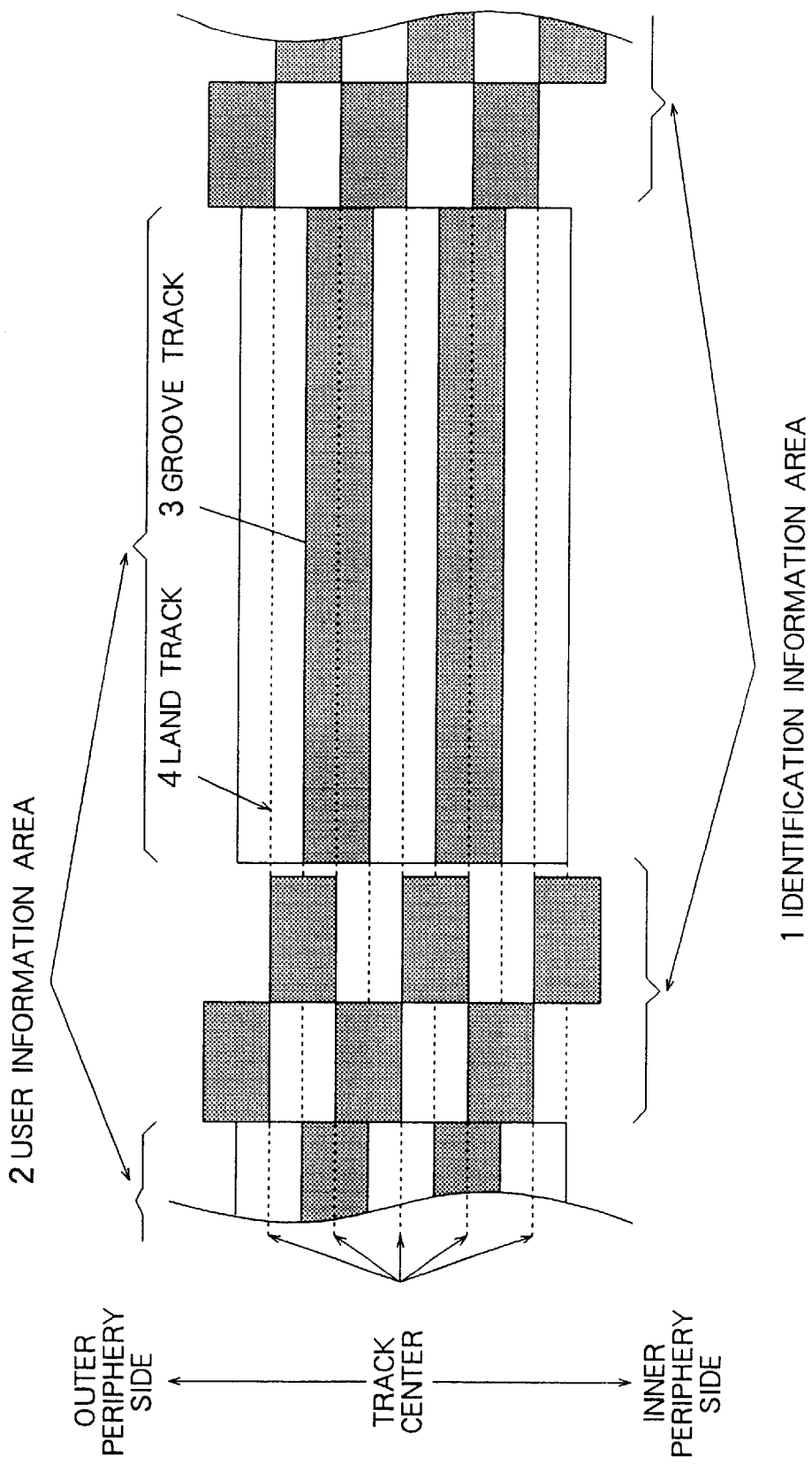
FIG. 11 shows another example of disposition of the conventional identification information portion.

It is assumed that the identification information is disposed in a staggering manner as shown in FIG. 11.

The output from the subtracting means 18 has a waveform as shown as (b) in FIG. 2B or (b') in FIG. 2C while the beam spot is scanning the center of a track. (b) and (b') indicate that the polarity of the output waveform from the subtracting means 18 depends on whether the track scanned by the beam spot is a land track or groove track. That is, the polarity of the output waveform depends on the direction of displacement of the identification information with respect to the position of the beam spot. When the beam spot passes the identification information area while scanning the center of a track, a "track offset with respect to the identification information" is a maximum (this is because the identification information is shifted relative to the center of the track by half a track pitch). In this case, the difference between the outputs of the two-part split photodetector 135 is maximum, and the output (b) of the subtracting means 18, that is a push-pull signal, is maximum or minimum. Consequently, the signal reproduced from the first identification information shifted radially outward with respect to the track center and the signal reproduced from the second identification information shifted radially inward form a waveform with opposite polarities with respect to the zero level (or reference level).

In the user information area, the beam spot scans the center of a track, and the outputs of the two-part split photodetector 135 are the same, and the output (b) from subtracting means 18 is zero (or reference level).

Figure 4:
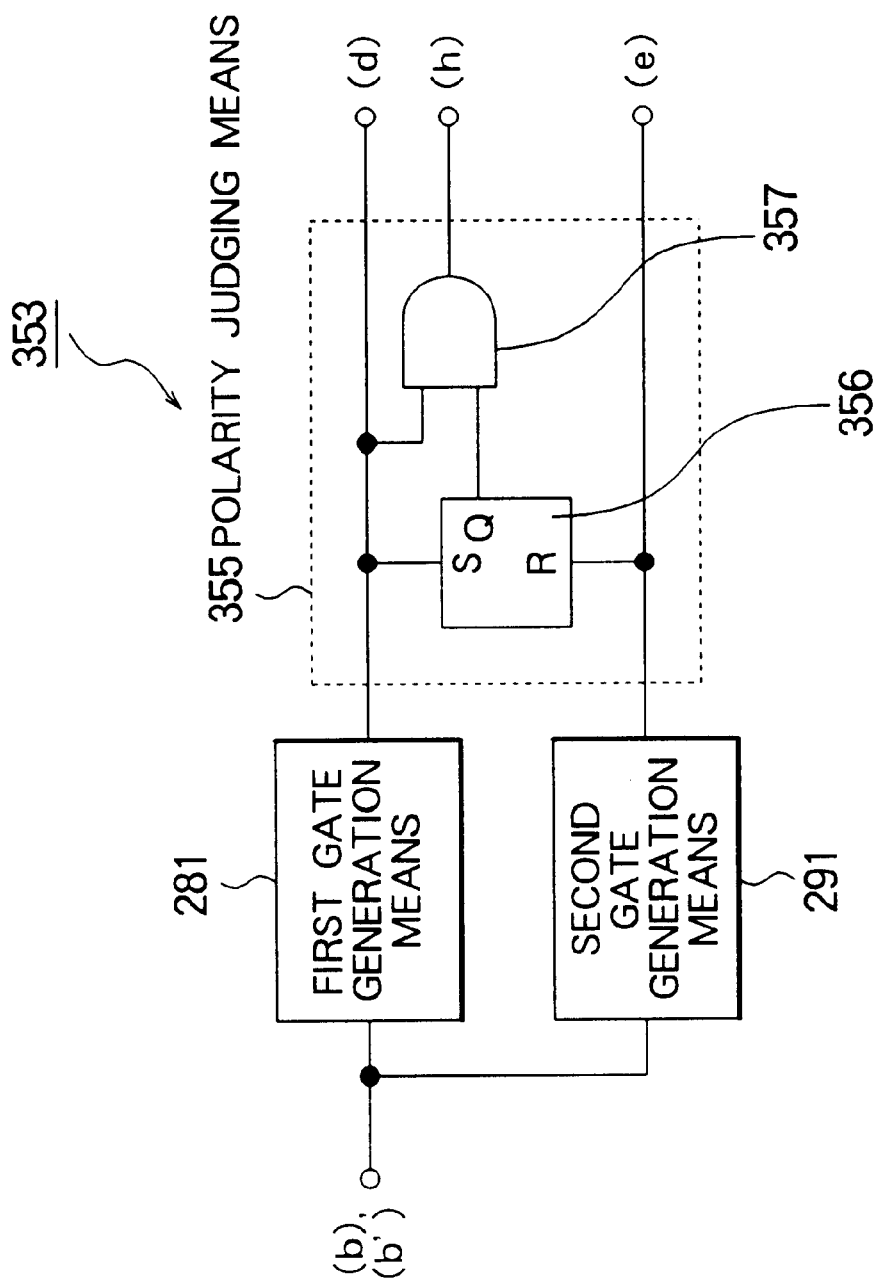
FIG. 4 shows the polarity switching signal generation means forming the optical information reproduction device of the first embodiment of the present invention.

As shown in FIG. 4, an example of the polarity switching signal generation means 353 comprises a first gate generation means 281, a second gate generation means 291, and a polarity judging means 355. Moreover, the polarity judging means 355 comprises an R-S flip-flop means 356 and an AND means 357.

The polarity switching signal generation means 353 generates a discrimination gate signal (h) shown in FIG. 2H used to discriminate the first identification information from the output signal (b) of the subtracting means 18. According to the discrimination gate signal, the switching means 354 selects and outputs either the output (i) (shown in FIG. 2D) of the buffer amplifier 351 or the output (j) (shown in FIG. 2E) of the reversing buffer amplifier 352 to the signal switching means 36. This makes the waveform (k) (shown in FIG. 2I) of the output signal of the difference signal processing means 35 similar to the output waveform (a) (shown in FIG. 2A) of the adding means 16, in regard to the polarity.

The signal switching means 36 selects the output (a) of the adding means 16 and the output (k) of the difference signal processing means 35 according to the switching signal (1) (shown in FIG. 2J) from the control gate generation means 25, and supplies the selected outputs to the waveform shaping means 37. The switching signal can be generated by an internal timer, started by a timing of which position of appearance can be identified. An example of such a timing is the address detection completion timing signal from the address information reproduction means 24. If the reproduced identification information is detected from the output of the adding means 16 in the same way as the reproduced user information is detected, the control gate generation means 25 may be set to always select the output (a) of the adding means 16 for the signal switching means 36.

Figure 5:
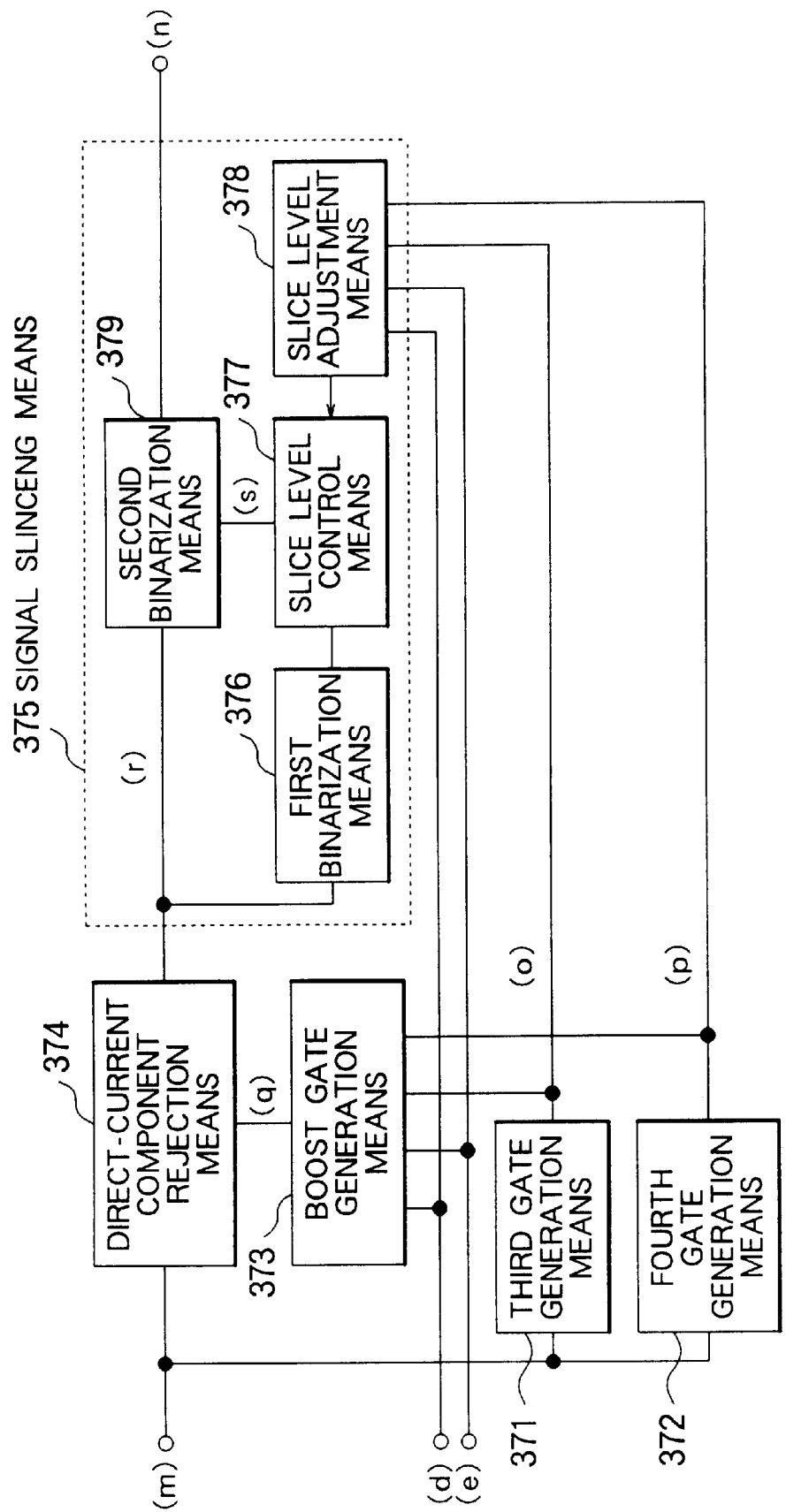
FIG. 5 shows the waveform shaping means forming the optical information reproduction device of the first embodiment of the present invention.

As shown in FIG. 5, the waveform shaping means 37 comprises a third gate generation means 371 which detects the user information area, a fourth gate generation means 372 which detects the position of a flaw on the medium, a boost gate generation means 373 which generates a first boost gate signal for changing the time constant of the direct-current component rejection, a direct-current component rejection means 374, and a signal slicing means 375. The signal slicing means 375 comprises a first binarization means 376, a slice level control means 377, a slice level adjustment means 378, and a second binarization means 379.

In the waveform shaping means 37, the third gate generation means 371 detects the user information area from the signal (m) (shown in FIG. 2K, and in FIG. 3A) input by the signal switching means 36, and the fourth gate generation means detects the position of a flaw on the medium. The boost gate generation means 373 generates a first boost gate signal (q) (shown in FIG. 3E) having a predetermined period at the beginning of the first and second identification information in the identification information area and the beginning and end of the user information area, by means of a one-shot means. The direct-current component rejection means 374 decreases the time constant for the period of the first boost gate signal input from the boost gate generation means 373 and reduces the direct-current component from the output signal (m) of the signal switching means 36 at a high speed, thereby keeping substantially constant direct-current components in the output (a) from the adding means 16 and the output (k) from the difference signal processing means 35. In addition, processing is performed to keep the amplitude of the output signal of the direct-current component rejection means 374 to a constant value, degradation in waveform resulting from the frequency response of the optical system is separately improved (reduced) in the identification information area and in the user information area by an equalization means, which is not shown. The improvement for the identification information area and the improvement for the user information area are made separately. Then, binarization is performed by the signal slicing means 375, and the waveform as shown as (n) shown in FIG. 3G is output.

The signal slicing means 375 optimizes the slice level to minimize the reproduction error. The signal (r) (shown in FIG. 3F) of which direct-current component has been removed by the direct-current component rejection means 374 is first converted into binary values by the first binarization means 376 at a specified slice level. Then, the slice level control means 377 adjusts the slice level to set the average duty ratio of the binary pulse to a specified value, and the slice level adjustment means 378 generates a second boost gate signal, so that the slice level is optimized at a high speed in the boost period.

The slice level adjustment means 378 may apply an offset to the slice level mentioned above. This offset may be set to such a value that the reproduction jitter and the reproduction error rate are minimized. Further, the value may be separately set for the first identification information area, second identification information area, and user information area, or the value may be separately set, depending on whether the beam spot is scanning a land track or groove track. Moreover, the offset value may be adjusted according to the reproduction speed. Furthermore, the durations of the first and second boost gate signals may be set independently or may be varied according to the reproduction speed, error rate, or jitter.

Moreover, the time constants of direct-current component rejection and slice level control may vary according to the reproduction speed.

The operation for reproducing address information and user information from the output of the waveform shaping means 37 is the same as that in the prior art and will not be described here.

Figure 12:
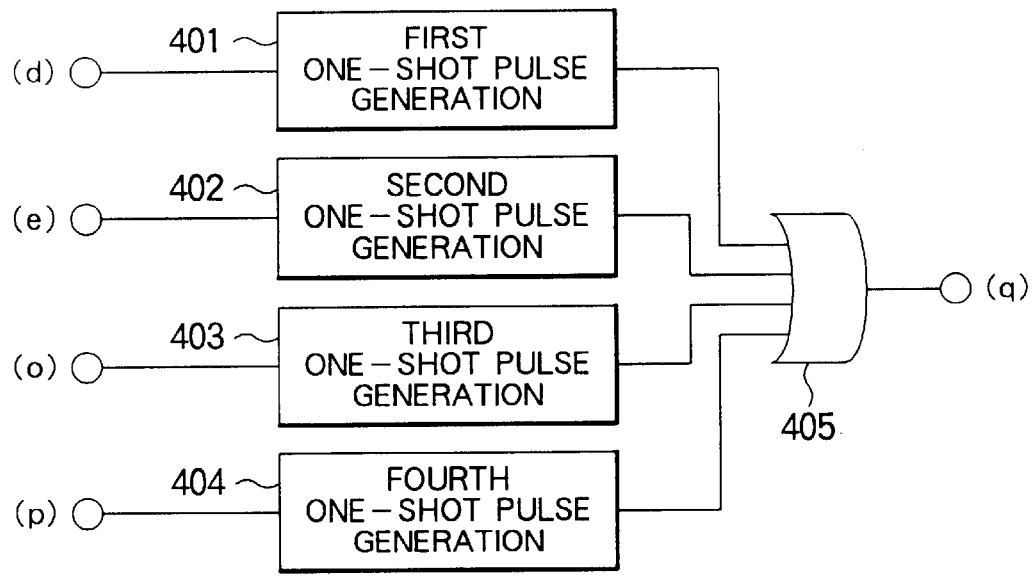
FIG. 12 shows the details of the boost gate generation means.

FIG. 12 shows the details of the boost gate generation means 373. As illustrated, it includes first to fourth one-shot pulse generation means 401 to 404 respectively receiving the signals (d), (e), (o) and (p), and an OR gate 405 receiving the outputs of the one-shot pulse generation means 401 to 404. Each of the one-shot pulse generation means produces a pulse which rises at the rising edge of the input, and has a certain duration.

Figure 13:
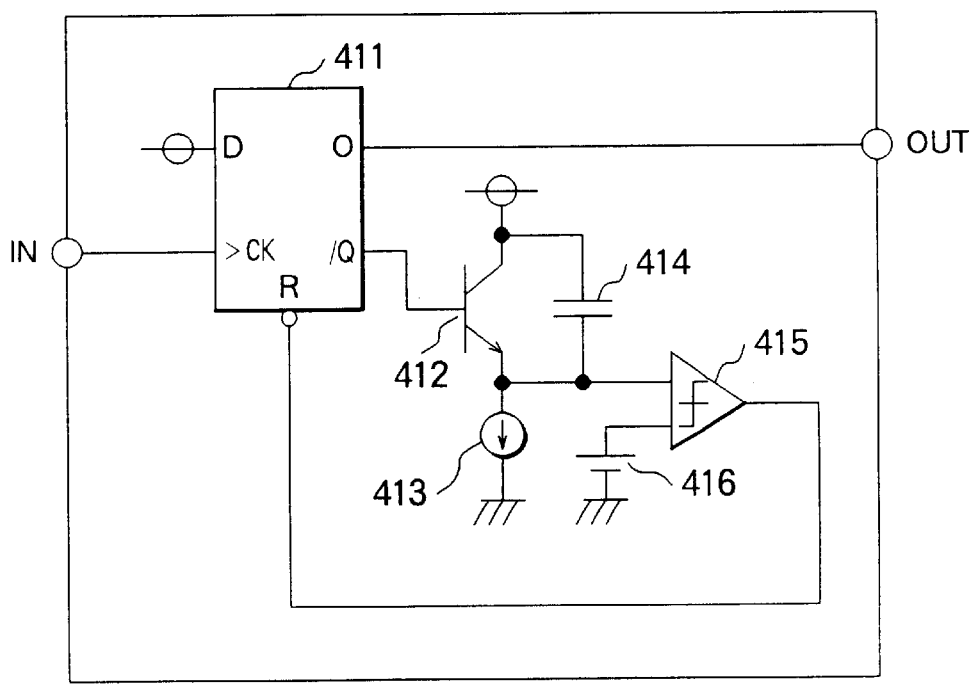
FIG. 13 shows details of each of the one-shot pulse generation means.
Figures 14A, 14B, 14C, 14D, 14E:
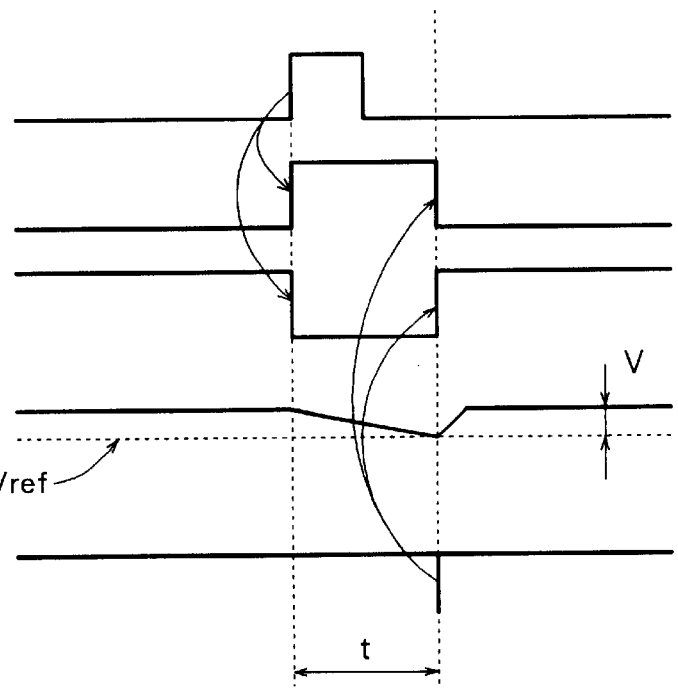
FIG. 14A to FIG. 14E shows the waveforms of the signals at various parts in the circuit of FIG. 13.

FIG. 13 shows details of each of the one-shot pulse generation means 401 to 404. FIG. 14A to FIG. 14E shows the waveforms of the signals at various parts in the circuit of FIG. 13.

As illustrated in FIG. 13, the one-shot pulse generation means comprises a flip-flop 411 having its CK input connected to the input terminal IN and having its Q output connected to the output terminal OUT of the one-shot pulse generation means, a transistor 402 having its base connected to the /Q (inversion of Q) terminal of the flip-flop 411, a constant-current source 413 having its one end connected to the emitter of the transistor 412, a capacitor 414 connected across the collector and the emitter of the transistor 412, and a comparator 415 having a first input terminal connected to the emitter of the transistor 412, and a second input terminal connected to a reference voltage means 416.

When the input (FIG. 14A) supplied via the terminal IN goes from "Low" to "High", the Q output (FIG. 14B) of the flip-flop 411 goes from "Low" to "High", while the /Q output (FIG. 14C) goes from "High" to "Low". The capacitor 414 is discharged with a time constant dependent on the capacitance C of the capacitor 414 and the current I of the constant-current source 413. Because of the discharge, the potential (FIG. 14D) at first input of the comparator 415 is lowered. The comparator 415 compares this potential with a reference level Vref supplied from the reference voltage means 416. If the potential at the first input becomes lower than the reference level Vref, the output (FIG. 14E) of the comparator 415 will be "Low". The output of the comparator 415 is connected to the reset terminal R of the flip-flop 411. When "Low" signal is supplied to the reset terminal R of the flip-flop 411, the Q output of the flip-flop 411 goes "Low", while the /Q output of the flip-flop 411 goes "High". When the /Q output of the flip-flop 411 goes "High", the transistor 412 is turned on, and the capacitor 414 is charged with a time constant dependent on the capacitance of the capacitor 414 and the driving capacity of the transistor. The potential on the first input of the comparator 415 rises, and when it exceeds the reference level Vref, the output of the comparator 415 goes from "Low" to "High". The upper limit of the input of the comparator 415 is the "High" level of the /Q output of the flip-flop 411 minus the base-to-emitter voltage VBE of the transistor 412.

The output of the flip-flop 411 is a pulse which rises at the rising edge of the input signal to the input terminal IN and has a duration determined by the capacitance C of the capacitor 414 and the current I of the constant-current source 413, and the reference level Vref.

For changing the duration of the pulse, the value of the current I of the constant-current source 413 is varied.

When the relationship between the condition for changing the duration of the pulse (reproduction speed, or the like) and the optimum duration of the pulse is not clear, an arrangement is adopted wherein the the current I of the constant-current source 413 is set by a digital-to-analog converter (DAC), and the DAC is set digitally by a controller. With such an arrangement, the freedom in varying the duration is expanded.

When the relationship between the condition for changing the duration of the pulse and the optimum duration of the pulse is known to be linear or logarithmic, the information for changing the duration of the pulse is provided in the form of an electric current, and the current I of the constant-current source 413 is set in an analog manner by the use of the current signal.

Figure 6:
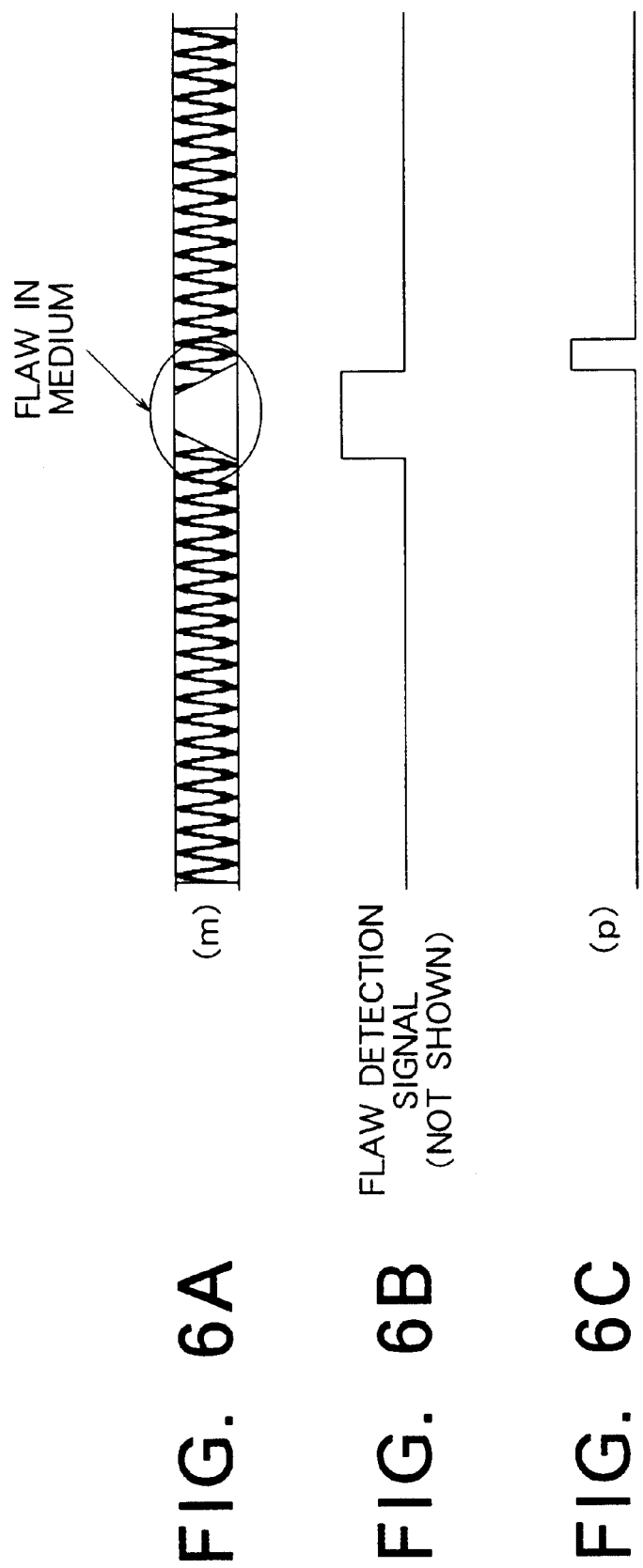
FIG. 6A to FIG. 6C show the waveforms of outputs from different blocks of the waveform shaping means when there is a flaw in the medium on the optical information reproduction device of the first embodiment of the present invention.
Figure 7:
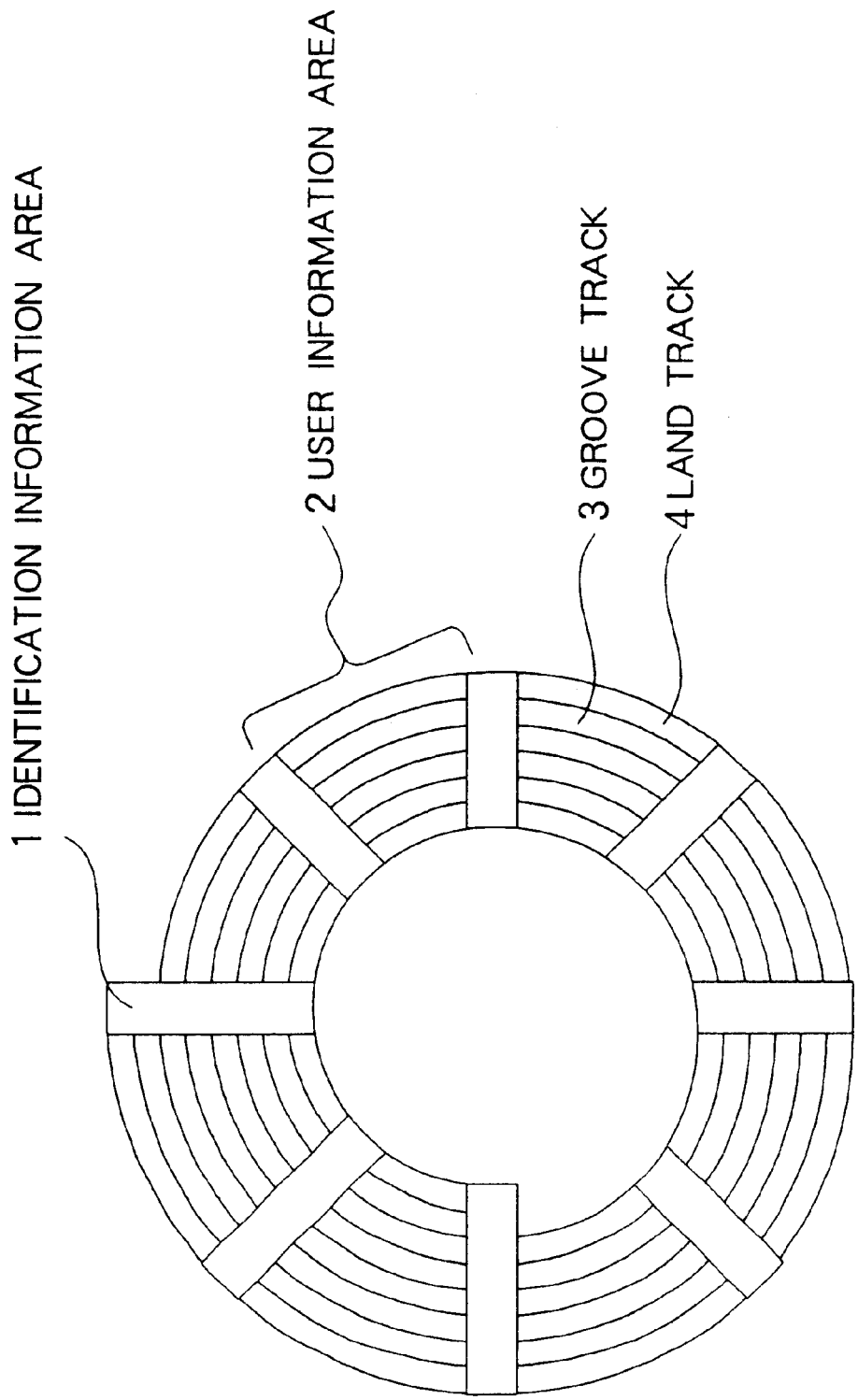
FIG. 7 shows the track format of the conventional optical disk.
Figure 8:
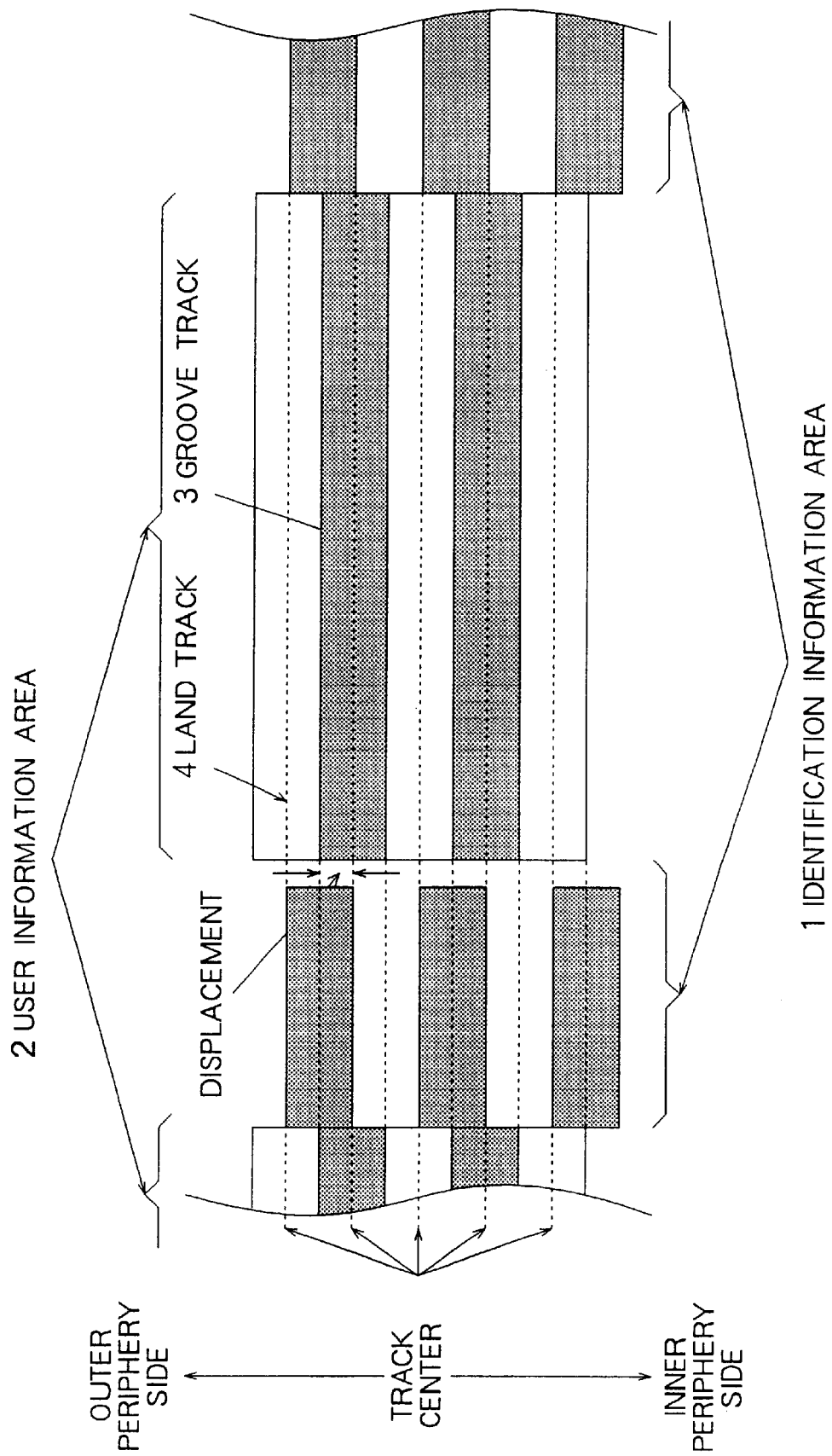
FIG. 8 shows an example of disposition of the conventional identification information portion.

The operation for a medium with a defect or flaw will next be described with reference to FIG. 6A to FIG. 6C. As shown in FIG. 6A to FIG. 6C, if the medium has a defect, the amplitude of the signal reproduced from the defective portion is reduced, varying the direct-current component of the signal and the slice level. Accordingly, the direct-current component and slice level need to be stabilized at a high speed immediately after the defective portion. Therefore, a fourth gate generation means 372 is provided so that the defective portion can be detected and the control time constant is reduced for a specified period immediately after the defect, thereby enabling high-speed stabilization.

A defect increasing the signal amplitude can be processed in the same way. That is, if a defect or flaw causes such a large variation in the direct-current component that cannot be followed with the time constant in the steady state, the time constant is reduced after the end of such an area so that the direct-current component and slice level are stabilized at a high speed.

The fourth gate generation means 372 detects the defective portion from the signal (m) (shown in FIG. 6A) input by the signal switching means 36 and outputs a flaw detection signal, which is not shown. The boost gate generation means 373 opens the boost gate for a specified period after the end of the defective portion according to the input flaw detection signal (p) (shown in FIG. 6C) and reduces the direct-current component at a high speed.

Likewise, the slice level adjustment means 378 opens the boost gate for a specified period after the end of the defective portion according to the input flaw detection signal, which is not shown, and adjusts the slice level at a high speed.

In the embodiment described above, the signal switching means 36 keeps selecting the output of the difference signal processing means 35 while the identification information area is being scanned. In an alternative arrangement, the signal switching means 36 selects the output of the difference signal processing mean 35 or the output of the adding means 16 according to the type of the disk, the probability of identification information detection, and the jitter in the reproduced identification information, so as to obtain a better result (lower error rate). "To select the output of the difference signal processing means 35" as recited in the appended claims should be construed to cover an arrangement where the selection of the output of the difference signal processing means 35 is continued throughout the period when the identification information area is being scanned, and an arrangement where the output of the difference signal processing means 35 and the output of the adding means 16 are selectively output according various conditions.

In the embodiment described, the two-part split photodetector 135 is used. Alternatively, a photodetector, such as four-part split photodetector, having more than two light-receiving parts may be used.

With the configuration as described above, the present invention produces the following effects.

When reproducing the identification information from the first and second identification information areas in which the identification information is disposed, being shifted by a specified distance radially outward and radially inward with respect to the track center, processing is performed by which the waveform pattern of the difference signal is made to be similar to the waveform pattern of the sum signal at the difference signal processing means in an analog manner. As a result, the waveform shaping circuit and subsequent blocks for detecting information from the analog signal can be used commonly for both signals. The size of the circuits can therefore be reduced.

When the switching means is provided to switch between the difference signal and reverse difference signal according to the direction of the shift of the identification signal while the identification information is reproduced, the first identification information and second identification information can be made to have an identical polarity.

When a gate signal indicating the position of appearance of the first identification information and a gate signal indicating the position of appearance of the second identification information are provided, and a switching means is provided to switch between the difference signal and the reverse difference signal according to the gate signals, the first identification information and second identification information can be made to have an identical polarity.

When a direct-current component rejection means is provided to remove the direct-current component from the waveform of the difference signal and the waveform of the sum signal and the time constants for control are switched at the points where the variation in the level of the signal occurs, the waveform pattern of the difference signal and the waveform pattern of the sum signal can be made to be similar to each other at a high speed. Further, by switching the time constants for control immediately after a flaw in the medium, a return can also be made at a high speed.

When a slice level controlling means is provided to optimize the slice level of a signal with a predetermined time constant, and a slice level adjustment means is provided to add an offset to the slice level set by the slice level controlling means, an optimum slice level can be set and the probability of signal detection can be improved.

When slice level offset values are set separately for the first and second identification information and user information, an optimum slice level can be set and the probability of signal detection can be improved.

When the time constant of slice level control is decreased immediately after the beginning of the first and second identification information and the user information, the slice level can be optimized at a high speed. Moreover, the slice level can also be optimized at a high speed by decreasing the time constant of slice level control immediately after a flaw in the medium.

When the period for which the control time constant of the direct-current component rejection means is reduced and the period for which the time constant of slice level control is reduced are set separately, the probability of signal detection can be improved.

When the period for which the control time constant of the direct-current component rejection means is reduced and the period for which the time constant of slice level control is reduced are adjusted according to the reproduction speed, the probability of signal detection can be improved at a variety of reproduction speeds.

When the control time constant of the direct-current component rejection means and the time constant of slice level control are adjusted according to the reproduction speed, the probability of signal detection can be improved at a variety of reproduction speeds.

When offset values are set separately for the first and second identification information and user information of the land tracks and of the groove tracks of the disk medium, the probability of signal detection can be improved.

What is claimed is:

1. An optical information reproduction device for reproducing information from an optical disk medium on which an identification information area including first identification information shifted radially outward with respect to the center of a recording track by a specified distance and second identification information shifted radially inward with respect to the center of a recording track by a specified distance, and a user information area disposed along the center of a recording track are disposed in concentric or spiral form, said optical information reproduction device comprising:

an optical head illuminating the optical disk medium with a light beam, and including a split photodetector having at least two light-receiving parts disposed on opposite side of a track tangential line in the far field of the optical disk medium and receiving light reflected from the optical disk medium, an adding means for adding the outputs of said optical head;

a subtracting means which obtains a difference between the outputs of said optical head;

a difference signal processing means which makes the output of said subtracting means similar to the output signal of said adding means in waveform pattern;

a signal selecting means which selectively outputs the output of said adding means and the output of said difference signal processing means; and a waveform shaping means which detects the information recorded on said disk medium from the output signal of said signal selecting means;

said signal selecting means being set to select the output of said difference signal processing means or the output of said adding means when said identification information area is being scanned and to select the output of said adding means when said user Information area Is being scanned.

2. A signal processing circuit of an optical information reproduction device for reproducing information from an optical disk medium on which an identification information area including first identification information shifted radially outward with respect to the center of a recording track by a specified distance and second identification information shifted radially inward with respect to the center of a recording track by a specified distance, and a user information area disposed along the center of a recording track are disposed in concentric or spiral form, and including an optical head illuminating the optical disk medium with a light beam, and including a split photodetector having at least two light-receiving parts disposed on opposite side of a track tangential line in the far field of the optical disk medium and receiving light reflected from the optical disk medium, said signal processing circuit comprising:

an adder adding the outputs of the split photodetector;

a subtracter which obtains a difference between the outputs of the split photodetector;

a difference signal processor which makes the output of said subtracter similar to the output signal of said adder in waveform pattern;

a signal selecter which selectively outputs the output of said adder and the output of said difference signal processor; and a waveform shaper which detects the information recorded on said disk medium from the output signal of said signal selecter;

said signal selecter selecting the output of said difference signal processor or the output of said adder when said identification information area is being scanned and selecting the output of said adder when said user information area is being scanned.

3. The signal processing circuit according to claim 2, wherein said difference signal processor comprises:

a polarity inverter inverting the polarity of the output of the subtracter;

a selector selectively outputting the output of the subtracter and the output of the polarity inverter; and a polarity switching signal generator generating a switching timing for said selecter.

4. The signal processing circuit according to claim 3, wherein said polarity switching signal generator comprises:

a first gate generator generating a first gate signal indicating the position at which the first identification information appears;

a second gate generator generating a second gate signal indicating the position at which the second identification information appears; and a polarity judger for judging the polarity of the waveform of the output of the subtracter.

5. The signal processing circuit according to claim 4, wherein said user information area includes user information and wherein said waveform shaper comprises:

a direct-current component rejecter removing the direct-current component of the output of the signal selecting means with a first time constant;

a third gate generator generating a gate signal indicating the position at which the user information appears;

a fourth gate generator generating a gate signal indicating the position of a defect;

a boost gate generator generating a first boost gate signal changing the first time constant of the direct-current component rejecter in accordance with the outputs of said first gate generator, said second gate generator, said third gate generator, and said fourth gate generator; and a signal slicer binarizing the output of the direct-current component rejecter;

said direct-current component rejecter reducing said first time constant for a predetermined period after the beginning of the first identification information, the beginning of the second identification information, the beginning of the user information, and the end of the defect.

6. The signal processing circuit according to claim 5, wherein said signal slicer comprises:

a first binarizing circuit binarizing the output of the direct-current component rejecter at a slice level;

a slice level controller controlling the slice level to an optimum value with a second time constant based on the output of said first binarization means;

a slice level adjuster applying an offset to the slice level set by said slice level controller; and a second binarizating circuit binarizing the output of the direct-current component rejecter at the output of said slice level adjuster.

7. The signal processing circuit according claim 6, wherein said slice level adjuster sets the offset values separately for the first identification information, the second information, and the user information.

8. The signal processing circuit according to claim 6, wherein said slice level adjuster generates a second boost gate signal in accordance with the outputs of the first to fourth gate generators, and reduces the time constant for control of the slice level, for the period of said second boost gate signal.

9. The signal processing circuit according to claim 8, wherein said first boost gate generator and the slice level adjuster set the duration of the boost gate signal separately from each other.

10. The signal processing circuit according to claim 8, wherein said boost gate generator and the slice level adjuster vary the duration of the boost gate signal according to the reproduction speed.

11. The signal processing circuit according to claim 6, wherein said direct-current component rejecter, and said slice level controller vary said time constants according to the reproduction speed.

12. The signal processing circuit according to claim 6, wherein said recording tracks comprise groove tracks in concentric or spiral form on the optical disk medium, and land tracks formed between groove tracks, and said slice level adjuster sets the offset separately for the first identification information, the identification offset information, and the user information of the groove tracks and land tracks.

13. An device reproducing information from an optical disk medium being scanned, said device comprising:

an adding circuit having at least two inputs, each of said at least two inputs being operatively connected to one of at least two outputs of an optical head, said adding circuit having as an output a first signal related to the sum of the at least two outputs of the optical head;

a subtracting circuit having at least two inputs, each of said at least two inputs being operatively connected to one of said at least two outputs of the optical head, said subtracting circuit having as an output a second signal related to the difference between the at least two outputs of the optical head;

a signal processing circuit having at least one input operatively connected to said output of said subtracting circuit, said signal processing circuit having as an output a third signal that is either related to the second signal or that is related to the selectively modified second signal, said processing circuit ensuring that said third signal is similar in waveform pattern to said first signal;

a signal selecting circuit having at least two inputs, one of said at least two selecting circuit inputs operatively connected to said output of said adding circuit and the other of said at least two selecting circuit inputs operatively connected to said output of said signal processing circuit, said signal selecting circuit having as an output a fourth signal selectively related to said first signal or selectively related to said third signal; and a waveform shaping circuit having at least one input operatively connected to said output of said signal selecting circuit, said waveform shaping circuit at least obtaining information recorded on the disk medium from said fourth signal.

14. The device according to claim 13 further comprising the optical head, said optical head illuminating the optical disk medium with a light beam, and said optical head including a split photodetector having at least two light-receiving parts disposed on opposite side of a track tangential line in the far field of the optical disk medium and receiving light reflected from the optical disk medium.

15. The device according to claim 13, wherein the optical disk medium has a user information area and an identification information area including at least first identification information and second identification information, wherein said signal selecting circuit selects said first signal or said third signal when the identification information area is being scanned, and wherein said selecting circuit selects said first signal when the user information area is being scanned.

16. The device according to claim 15, wherein said signal processing circuit comprises:

a polarity inverting circuit outputting a fifth signal related to the second signal having an inverted polarity;

a timing signal generating circuit generating a switching timing signal; and a second selecting circuit having an input operatively connected to receive said switching timing signal and outputting a sixth signal selectively related to the second signal or the fifth signal.

17. The device according to claim 16, wherein said polarity inverting circuit comprises:

a first circuit generating a first gate signal indicating the position at which the first identification information appears;

a second circuit generating a second gate signal indicating the position at which the second identification information appears; and a polarity judging circuit judging the polarity of the waveform of said second signal.

18. The device according to claim 17, wherein said waveform shaping circuit comprises:

a third circuit generating a third gate signal indicating the position at which the user information appears;

a fourth circuit generating a fourth gate signal indicating the position of a defect;

a direct-current rejection circuit having an input operatively connected to said signal selecting circuit and outputting, at a first time constant a seventh signal related to said fourth signal but with the direct-current component being removed;

a boost circuit generating a first boost gate signal changing said first time constant depending on said first gate signal, said second gate signal, said third gate signal, and said fourth gate signal; and a signal slicing circuit having an input operatively connected to said direct-current rejection circuit and having as output an eighth signal related to the binarization of said sixth signal;

wherein said direct-current rejection circuit reduces said first time constant for a first period after the beginning of the first identification information, the beginning of the second identification information, the beginning of the user information, and the end of the defect.

19. The device according to claim 18, wherein said signal slicing circuit comprises:

a first binarization circuit binarizing said seventh signal at a slice level;

slice level control circuit controlling said slice level to an optimum value with a second time constant based on the output of said first binarization circuit;

slice level adjustment circuit applying an offset value to said slice level set by said slice level control circuit; and a second binarization circuit binarizing said seventh signal at the output of said slice level adjustment circuit.

20. The device according claim 19, wherein said slice level adjustment circuit sets the offset value depending on the first identification information, the second information, and the user information.

21. The device according to claim 19, wherein said slice level adjustment circuit generates a second boost gate signal according to said first, second, third, and fourth circuits, and wherein said slice level adjustment circuit reduces said second time constant for the duration of said second boost gate signal.

22. The device according to claim 21, wherein said boost circuit and said slice level adjustment circuit independently set the durations of said first boost gate signal and said second boost gate signal, respectively.

23. The device according to claim 21, wherein said boost circuit and the slice level adjustment circuit vary the durations of said first boost gate signal and said second boost gate signal, respectively, according to a reproduction speed.

24. The device according to claim 19, wherein said direct-current rejection circuit and said slice level control circuit vary said first and said second time constants, respectively, according to a reproduction speed.

25. The device according to claim 19, wherein and said slice level adjuster sets the offset separately for the first identification information, the identification offset information, and the user information of the groove tracks and land tracks.

* * * * *